United States Patent Office 3,640,956
Patented Feb. 8, 1972

3,640,956
POLYBENZIMIDAZOLECARBOXAMIDES
AND PROCESS
James Guilbert Colson, Williamsville, N.Y., assignor to
E. I. du Pont de Nemours and Company, Wilmington,
Del.
No Drawing. Filed Apr. 21, 1969, Ser. No. 818,072
Int. Cl. C08g 20/32
U.S. Cl. 260—47 CP        5 Claims

ABSTRACT OF THE DISCLOSURE

Polybenzimidazolecarboxamide polymers are provided; these are prepared by treating a polymer containing imidazopyrrolone ring systems with ammonia; the polymers are useful as adhesives, especially for high temperature applications.

THE INVENTION

The present invention relates to novel polymers and a process of manufacture therefor. More particularly, the present invention is directed to novel heterocyclic polymers of benzimidazole-carboxamide and a process of manufacture therefor.

According to the present invention there are provided polymers of benzimidazolecarboxamides having the following recurring structural unit:

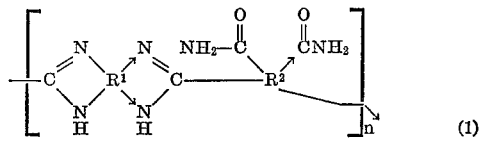

wherein:

$R^1$ and $R^2$ are each tetravalent aromatic radicals;
each pair of —N= and —NH— is attached to $R^1$ in ortho or peri positions;
each —$CONH_2$ group is attached to $R^2$ in an ortho or peri position to a bond from $R^2$ to an imidazo ring;
the arrows denote isomerism.

The polybenzimidazolecarboxamides of the invention are characterized by an inherent viscosity sufficiently great to provide film and fiber forming polymers.

The polybenzimidazolecarboxamides of the present invention are useful as adhesives, especially high temperature adhesives and in application where high temperature electrical insulation materials are cemented together or to other substrates such as metals. The polybenzimidazolecarboxamides may be used for bonding metal to metal. The polymers of the present invention, upon heat treatment above 200° C., appear to undergo reconversion to polymers containing imidazopyrrolone ring systems like those in the polymers from which they were prepared. This transformation begins in a matter of minutes and proceeds to a substantial extent in a matter of hours. At higher temperature, the transformation is faster.

According to the present invention, there is also provided a process for preparing the above described polybenzimidazolecarboxamides which comprises reacting as by contacting a polymer containing an imidazopyrrolone ring system with ammonia. In a preferred embodiment, the polymer containing an imidazopyrrolone ring system, in any convenient form such as powder, film or fiber, is subjected to an atmosphere of gaseous anhydrous ammonia. Suitable temperatures for conducting the reaction may vary from room temperature or below, to as high as 250° C. or higher. Temperatures in the range of about 25° C. to about 150° C. have been found to be convenient. The pressure of the ammonia gas during treatment can be varied over a wide range, as, for example, from one-tenth of an atmosphere or lower to 100 atmospheres or higher.

The process of the invention also may be carried out by subjecting the polymer containing an imidazopyrrolone ring system to a solution of ammonia in a suitable liquid carrier such as, for example, ether, ethanol, acetone, etc., which may be heated to a temperature above room temperature. Progress of the conversion may easily be followed by examining the infrared spectrum of a sample of the imidazopyrrolone polymer. Partial conversion is detected by the appearance of absorption bands at 6.0 microns. Substantial completion of the conversion is achieved when the absorption bands at 5.7–5.8 microns have disappeared.

Relatively thick articles of imidazopyrrolone polymers, such as thick fibers, film or blocks, can be treated so as to transform only a layer on the surface thereof to the polybenzimidazolecarboxamide. In this way, an article of imidazopyrrolone polymer is obtained having a surface so modified as to enable that surface to be adhesively secured or attached to another article such as a sheet of metal. This procedure is especially useful for thick articles because the remainder or untreated portion of the article is retained as the highly stable imidazopyrrolone polymer, and the time required for ammonia treatment is much shorter than that for complete treatment of the article.

The polymers which contain an imidazopyrrolone ring system for use in the process of the present invention have the following recurring structural unit:

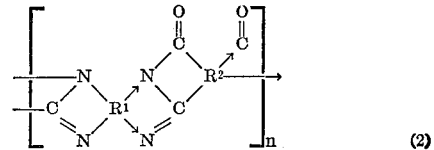

wherein $R^1$, $R^2$, the bond orientation, the arrows, and $n$ are all as defined hereinabove.

It should be understood that while the precursor polymers used in making the polymers of the invention are described as containing "imidazopyrrolone" ring systems, this term is strictly accurate only when the paired functional groups in each starting material have ortho orientation. When the orientation is peri in either or both starting materials, the nomenclature becomes very complex. In the four possible combinations of compounds wherein the functional groups are ortho or peri, the polymers are characterized by recurring units comprising fused rings including, in part, a bicyclic system which is either (A) 5-ketopyrrolo [1,2-a]imidazole;
(B) 5-keto-imidazo[1,2-a]pyridine;
(C) 6-keto-pyrrolo[1,2-a]pyrimidine or
(D) 6-keto-pyrido[1,2-a]pyrimidine:

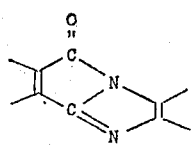

A

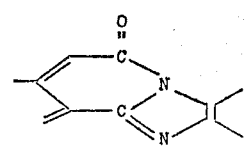

B

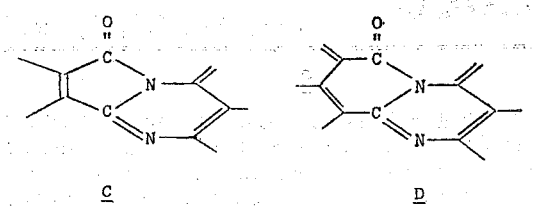

In order to avoid a long recitation of excessively complicated names, polymers containing any of these four types of ring systems, for the purpose of this invention, are described as polymers containing imidazopyrrolone ring systems.

The synthesis of polymers containing imidazopyrrolone ring systems is now well known and described in U.S. Pat. No. 3,414,543. As described in U.S. Pat. No. 3,414,543, the polymers containing imidazopyrrolone ring systems are obtained by reacting at least one organic tetraamine with at least one tetracarboxylic acid dianhydride in a suitable organic solvent and at a temperature below about 125° C.

Suitable representative aromatic tetracarboxylic acid dianhydrides from which $R^2$ stems include:

pyromellitic dianhydride;
2,3,6,7-naphthalene tetracarboxylic dianhydride;
3,3',4,4'-diphenyl tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
naphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
pyrazine-2,3,5,6-tetracarboxylic dianhydride;
2,2-bis(2,3-dicarboxyphenyl) propane dianhydride;
1,1-bis(3,4-dicarboxyphenyl) ethane dianhydride;
bis(3,4-dicarboxyphenyl) methane dianhydride;
benzene-1,2,3,4-tetracarboxylic dianhydride;
thiophene-2,3,4,5-tetracarboxylic dianhydride; etc.

Suitable tetra-amine compounds from which $R^1$ stems include for example:

3,3'-diaminobenzidine;
bis(3,4-diaminophenyl)methane;
1,2-bis(3,4-diaminophenyl)ethane;
2,2-bis(3,4-diaminophenyl) propane;
bis(3,4-diaminophenyl) ether;
bis(3,4-diaminophenyl) sulfide;
bis(3,4-diaminophenyl) sulfone;
3,4,3',4'-tetraaminodiphenyl;
1,2,4,5-tetraaminobenzene;
2,3,6,7-tetraaminonaphthalene;
1,4,5,8-tetraaminonaphthalene; etc.

The principle and practice of the present invention will now be illustrated by the following examples.

EXAMPLE 1

A solution of 2.180 g. (0.010 mol) of pyromellitic dianhydride in 40 ml. of dry N,N-dimethylacetamide (DMAC) was added over a period of three hours to a stirred solution of 2.140 g. (0.010 mol) of 3,3'-diaminobenzidine in 30 ml. of dry DMAC maintained under nitrogen and cooled in ice water. The resulting polymainoamide-acid had an inherent viscosity of 0.59, measured on a 0.5% by weight solution in DMAC at 30° C. DMAC was removed under vacuum from the polymer solution until the concentration of polymer was 12% by weight. The resulting solution was cast onto a glass plate and dried under vacuum at 150° C. to provide a film which was stripped from the plate and further dried in air at 220° C. overnight. Examination of the resulting film by infrared showed it to be largely the imidazopyrrolone structure.

The polymer film containing imidazopyrrolone ring systems was then subjected to an atmosphere of ammonia. Infrared examination of the resulting film showed that it had been transformed to a benzimidazolecarboxamide structure.

The latter film was then heated at 215° C. and examined at intervals by infrared. Regeneration of imidazopyrrolone ring systems appeared to begin within minutes, and to be well toward completion after 70 hours.

EXAMPLE 2

2.1812 g. (0.01000 mole) of pyromellitic dianhydride was added over a period of 2.5 hours to a stirred solution of 2.1426 g. (0.01000 mole) of 3,3'-diaminobenzidine in 40 ml. of dry DMAC maintained under nitrogen and cooled in ice water. The resulting polyaminoamide-acid had an inherent viscosity of 0.60, measured on a 0.5% by weight solution in DMAC at 30° C. The solution was cast onto a glass plate and placed under vacuum at 60° C. for 2 hours to remove solvent, and was heated to 250° C. for 18 hours to provide a 0.5-mil. film of the imidazopyrrolone polymer.

The latter film was treated with ammonia gas (dried with sodium) for 10 minutes, and was shown by infrared analysis to be the benzimidazolecarboxamide polymer.

The latter polymer was used as an adhesive for bonding aluminum by forming a lap joint between two pieces of chromate-etched aluminum and placing a piece of the benzimidazolecarboxamide in the lap joint therebetween. The aluminum specimens were pressed together under 200 p.s.i. pressure and at 400° C. for 1 minute. The tensile shear strength of the bond provided by the lap joint was 122 p.s.i.

What is claimed is:
1. Film and fiber forming polymer of benzimidazolecarboxamide consisting essentially of the following recurring structural unit:

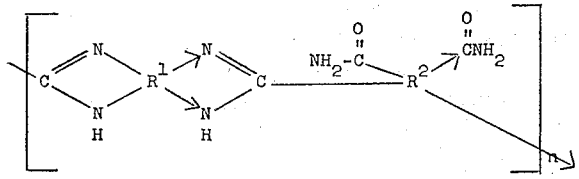

wherein
$R^1$ is a tetravalent radical selected from the group consisting of carbocyclic aromatic radicals and carbocyclic aromatic radicals bridged by radicals selected from the group of alkylene of 1 to 3 carbon atoms, oxygen, sulfur and sulfone, said tetravalent radicals being substituted with nitrogen atoms in pairs, the members of each pair being on ortho or peri carbon atoms of said tetravalent radicals;

$R^2$ is a tetravalent radical selected from the group consisting of carbocyclic aromatic radicals, and carbocyclic aromatic radicals bridged by a radical selected from alkylene of 1 to 3 carbon atoms, O, and $SO_2$, the tetravalent radical substituted with carbon atoms in pairs, the members of each pair being on ortho or peri carbon atoms of the tetravalent radicals;

each pair of —N= and —NH— is attached to $R^1$ in ortho or peri positions;

each —$CONH_2$ group is attached to $R^2$ in an ortho or peri position to a bond from $R^2$ to an imidazo ring; the arrows denote isomerism.

2. An article of manufacture consisting essentially of a film structure of film and fiber forming polymer of benzimidazolcarboxamide consisting essentially of the following recurring structural unit:

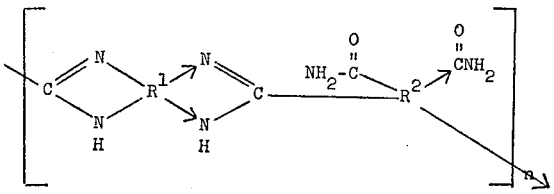

wherein
$R^1$ is a tetravalent radical selected from the group consisting of carbocyclic aromatic radicals and carbocyclic aromatic radicals bridged by radicals selected from the group of alkylene of 1 to 3 carbon atoms, oxygen, sulfur and sulfone, said tetravalent radicals being substituted with nitrogen atoms in pairs, the members of each pair being on ortho or peri carbon atoms of said tetravalent radicals;

$R^2$ is a tetravalent radical selected from the group consisting of carbocyclic aromatic radicals, and carbocyclic aromatic radicals bridged by a radical selected from alkylene of 1 to 3 carbon atoms, O, and $SO_2$, the tetravalent radical substituted with carbon atoms in pairs, the members of each pair being on ortho or peri carbon atoms of the tetravalent radicals;

each pair of —N= and —NH— is attached to $R^1$ in ortho or peri positions;

each —$CONH_2$ group is attached to $R^2$ in an ortho or peri position to a bond from $R^2$ to an imidazo ring;

the arrows denote isomerism.

3. A process for producing a film and fiber forming polymer of benzimidazolecarboxamide which comprises reacting an imidazopyrrolone polymer consisting essentially of the recurring structural unit:

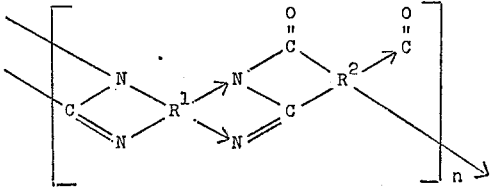

wherein
$R^1$ is a tetravalent radical selected from the group consisting of carbocyclic aromatic radicals and carbocyclic aromatic radicals bridged by radicals selected from the group of alkylene of 1 to 3 carbon atoms, oxygen, sulfur and sulfone, said tetravalent radicals being substituted with nitrogen atoms in pairs, the members of each pair being on ortho or peri carbon atoms of said tetravalent radicals;

$R^2$ is a tetravalent radical selected from the group consisting of carbocyclic aromatic radicals, and carbocyclic aromatic radicals bridged by a radical selected from alkylene of 1 to 3 carbon atoms, O, and $SO_2$, the tetravalent radical substituted with carbon atoms in pairs, the members of each pair being on ortho or peri carbon atoms of the tetravalent radicals;

each pair of —N= is attached to $R^1$ in ortho or peri positions;

each —CO group is attached to $R^2$ in an ortho or peri position to a bond from $R^2$ to an imidazo ring;

the arrows denote isomerism.
with ammonia whereby to obtain the corresponding polybenzimidazolcarboxamide.

4. The process of claim 3 wherein said reaction is conducted at temperatures between about 20° C. and about 250° C.

5. The process of claim 3 wherein said polymer containing an imidazopyrrolone ring system is in powder, film or fiber form.

References Cited
UNITED STATES PATENTS

| | | | |
|---|---|---|---|
| 3,414,543 | 12/1968 | Paufler | 260—78 |
| 3,423,366 | 1/1969 | De Brunner et al. | 260—78 |
| 3,435,004 | 3/1969 | Hathaway et al. | 260—78 |
| 3,471,453 | 10/1969 | Rabilloud et al. | 260—78 |
| 3,487,051 | 12/1969 | Suzuki et al. | 260—78 |
| 3,498,948 | 3/1970 | Minami et al. | 260—78 |

HAROLD D. ANDERSON, Primary Examiner

U.S. Cl. X.R.

161—227 R; 260—78 TF